(12) United States Patent
Savage (10) Patent No.: US 9,596,023 B2
(45) Date of Patent: Mar. 14, 2017

(54) SATELLITE COMMUNICATION CENTRE

(71) Applicant: EXCELERATE TECHNOLOGY LIMITED, Cardiff, South Glamorgan (GB)

(72) Inventor: David Savage, Cardiff (GB)

(73) Assignee: Excelerate Technology Limited, Cardiff (GB)

(*) Notice: Subject to any disclaimer, the term of this patent is extended or adjusted under 35 U.S.C. 154(b) by 0 days.

(21) Appl. No.: 14/343,699

(22) PCT Filed: Sep. 17, 2012

(86) PCT No.: PCT/GB2012/052289
§ 371 (c)(1),
(2) Date: Mar. 7, 2014

(87) PCT Pub. No.: WO2013/038209
PCT Pub. Date: Mar. 21, 2013

(65) Prior Publication Data
US 2014/0227967 A1    Aug. 14, 2014

(30) Foreign Application Priority Data
Sep. 16, 2011   (GB) .................... 1116053.8

(51) Int. Cl.
*H04M 11/04* (2006.01)
*H04B 7/185* (2006.01)

(52) U.S. Cl.
CPC ..... *H04B 7/18515* (2013.01); *H04B 7/18517* (2013.01)

(58) Field of Classification Search
CPC .................. H04B 7/18515; H04B 7/18517
(Continued)

(56) References Cited

U.S. PATENT DOCUMENTS 5,955,988 A   9/1999  Blonstein et al.
5,991,615 A * 11/1999  Coppinger et al. ........... 455/406
(Continued)

FOREIGN PATENT DOCUMENTS

WO    02099948 A1    12/2002

OTHER PUBLICATIONS

The International Search Report European Search Report dated Sep. 30, 2013.
(Continued)

*Primary Examiner* — Dominic Rego
(74) *Attorney, Agent, or Firm* — Troutman Sanders, LLP; Ryan A. Schneider (57) ABSTRACT

The invention provides a computer-implemented system (and corresponding method) arranged and configured to manage, manipulate or monitor a plurality of devices provided in association with a unit. The unit may be a vehicle or structure, such as an automotive vehicle, a boat, a trailer or building. The vehicle or structure may be an incident command unit. The invention enables a user to monitor or manage the plurality of devices via a consolidated interface. The plurality of devices may include a satellite support mechanism supporting satellite-related equipment provided in association with the unit; and the system may comprise a satellite controller component to enable a user to manipulate and/or re-orientate the satellite support mechanism via the consolidated interface.

30 Claims, 8 Drawing Sheets

(58) Field of Classification Search
USPC ....... 455/404.1, 414.1, 418–420, 423, 456.1, 455/457, 9, 67.11, 115.1
See application file for complete search history.

(56) References Cited

U.S. PATENT DOCUMENTS

| | | | |
|---|---|---|---|
| 6,188,300 | B1 | 2/2001 | Rodeffer |
| 6,332,069 | B1* | 12/2001 | Zhao et al. ................. 455/12.1 |
| 7,546,139 | B2 | 6/2009 | Money et al. |
| 8,442,511 | B2* | 5/2013 | Woods et al. ................ 455/420 |
| 2002/0084918 | A1* | 7/2002 | Roach ........................... 340/988 |
| 2003/0060808 | A1* | 3/2003 | Wilk ................................. 606/1 |
| 2003/0214449 | A1* | 11/2003 | King ............................. 343/757 |
| 2005/0248486 | A1 | 11/2005 | Lee et al. |
| 2006/0015543 | A1* | 1/2006 | Humphrey ................... 707/202 |
| 2006/0074557 | A1* | 4/2006 | Mulligan et al. ............. 701/213 |
| 2007/0101297 | A1* | 5/2007 | Forstall ............... G06F 3/04817 715/841 |
| 2007/0229377 | A1 | 10/2007 | McCarrick et al. |
| 2008/0062299 | A1* | 3/2008 | Matanhelia ............ G09B 23/28 348/333.11 |
| 2008/0122646 | A1* | 5/2008 | Bradshaw et al. ....... 340/815.45 |
| 2009/0058620 | A1* | 3/2009 | Bernardon ............... 340/310.11 |
| 2009/0275844 | A1* | 11/2009 | Al-Ali ........................... 600/500 |
| 2009/0300577 | A1* | 12/2009 | Bernardini ................ G06F 8/70 717/101 |
| 2010/0156653 | A1* | 6/2010 | Chaudhari ............... G01C 25/00 340/686.1 |
| 2010/0268584 | A1* | 10/2010 | Pullur ................... G06Q 30/02 705/14.16 |
| 2010/0293580 | A1* | 11/2010 | Latchman ....................... 725/71 |
| 2010/0327119 | A1* | 12/2010 | Horowitz et al. ......... 244/173.1 |
| 2011/0119517 | A1* | 5/2011 | Beeco et al. .................. 713/340 |
| 2011/0201900 | A1* | 8/2011 | Zhang et al. ................. 600/300 |
| 2011/0291828 | A1* | 12/2011 | Walker et al. ........... 340/539.27 |
| 2012/0246711 | A1* | 9/2012 | Patel et al. ...................... 726/12 |
| 2012/0278454 | A1* | 11/2012 | Stewart et al. ............... 709/220 |
| 2013/0013378 | A1* | 1/2013 | Norris .................... G06Q 30/02 705/7.38 |

OTHER PUBLICATIONS

"Excel, Autumn 2010," Jan. 1, 2010, XP055050052; http://www.excelerate-group.com/images/upload/news/newsletters/ex_newsletter_a3_a-winter_10.pdf, p. 6.

"A Dash of Simplicity," BAPCO Journal Jan./Feb. 2011, Feb. 1, 2011,pp. 18-27, XP055050039; http://www.bapcojournal.com/news/get_file.php3/id/204/file/Command and control.pdf.

"Custom Emergency Communications Vehicle with Integrated Satellite Services for Disaster Recovery and First Responder Organizations," Oct. 1, 2007, XP055050024; http://www.spacenet.com/news/media/govttechnology-10.07.pdf.

Myers, et al., "Satellite Strategies for Disaster Recovery and Business Continuity," Disaster Resource Guide, Jan. 1, 2007, XP055050021; http://www.spacenet.com/news/media/DRG.pdf.

The search report for priority application GB1116053.8 dated Mar. 6, 2012.

Communication Pursuant to Article 94(3) EPC from related EP 12780775.8, dated May 11, 2015, 4 pages.

* cited by examiner

SATELLITE COMMUNICATION CENTRE

CROSS-REFERENCE TO RELATED PATENT APPLICATIONS

This application is a United States National Stage Application of, and claims the benefit pursuant to 35 U.S.C. §371 of International Patent Application Serial No. PCT/GB2012/052289, filed on Sep. 17, 2012, which claims priority to and the benefit of Great Britain Application No. 1116053.8, filed on Sep. 16, 2011, both which are incorporated herein in their entirety by reference.

This invention relates generally to the field of communications units. In particular, it relates to satellite communications centres which provide converged data, video, voice, telecommunication, computing, broadband and/or satellite capabilities. The invention is suited for use with transportable units or fixed structures, which may be land-based or water-based. It is particularly, but not exclusively, suited for use with mobile communications centres, such as those used by emergency and response organisations; for example, command and control units, or incident response units.

When an incident occurs such as a natural disaster, terrorist attack or social disorder, those responsible for dealing with the situation require communications links in order to manage and deal with the incident effectively. Temporary (and often mobile) command centres may be set up to provide a centralised communications hub or command post.

Mobile command centres may be used by organisations such as the emergency services, counter terrorist agencies, police and government departments and even private sector companies and sporting organisations depending upon the circumstances. In recent times, satellite broadband communications have proved extremely useful in conjunction with mobile Incident Command Units (ICUs) or Mobile Satellite Communications Centres (MSCCs), as they may be known.

It is often advantageous to set up such ICUs within vehicles so that they may be easily transported to the desired location, although portable cabins, trailers, welfare units and temporary accommodation units may also be fitted out as ICUs. Typically, ICU vehicles feature satellite broadband communications, PBX voice solutions (allowing different types of mobile phones and radio to communicate with each other), independent GSM networks (in case main GSM networks collapse under the pressure of a major event), wireless capabilities and real-time video. Mast mounted or rapidly deployable dual thermal and/or optical cameras may also be provided, along with COFDM body-worn cameras.

Combined with the use of wireless laptops, access to Virtual Private Networks, emergency databases, gazetteers, mapping, the Internet and aerial and satellite imagery, these technologies provide ICUs with huge command and communications capabilities, and provide solutions which are sufficiently resilient to cope with the kinds of communications overload and failures that often occur during major emergencies.

The provision of satellite broadband and wireless technologies can be particularly advantageous within an ICU because it provides a greater secure data, voice and video capacity than was previously possible using conventional technologies. Satellite broadband can be deployed anywhere, anytime, from temporary, mobile or fixed locations. The ICU is able to communicate swiftly and effectively with devices and/or staff located remotely from the incident—for example, staff located at organisational headquarters. Each unit may also be configured to communicate with other communications units, providing interoperable and multi-agency capabilities.

As a result, the suite of integrated communications solutions provided in an ICU vehicle provides commanders and managers with the ability to access accurate information in real time from a wide variety of different applications. The satellite communications enable command and control vehicles to receive and transmit data from all responders and emergency teams to achieve a common operational picture of the incident. Combining this with wireless networks, personnel using PDAs, laptops, mobile phone and data terminals are able to access tactical plans, live video streaming or information from strategic emergency planning software. The range can be extended using self-powered, rapidly deployable MESH wireless nodes.

However, although the large and diverse array of devices provided on such ICUs offer advantageous technical abilities the large variety of devices can pose a problem for the staff who have to manage, control and monitor them. Typically, each device must be managed independently of the other devices. There is no simple, centralised means of coordinating the activities of the various devices and so the operator must frequently switch between a potentially large number of devices in order to monitor their operational status. This slows the operator down during a potentially time-pressured emergency or incident, and complicates the role of the operator.

A similar difficulty arises in respect of communication centres provided on or in marine-based units, such as ships. Modern watercraft often carry sophisticated communications technologies, including satellite capabilities. As explained above, the number and variety of devices provided in conjunction with such communications centres can make the technology difficult to use because the operator must be proficient with at using each individual device, and needs to repeatedly switch between a potentially large number of devices as and when required.

US 2007/0149120 A1 (Money) discloses a system for establishing and maintaining communications across disparate networks, comprising a satellite dish and control unit. The control unit comprises a network management server and a satellite alignment component. However, the arrangement disclosed in Money does not offer a mechanism for reducing the effort, time and expertise required to interact with and control each of the devices individually.

An improved solution has now been devised.

Thus, in accordance with the present invention there is provided a computer-implemented system and method as claimed herein.

The invention is suitable for managing and/or monitoring a plurality of devices provided in conjunction with a communications centre carried in or on a unit. The system is arranged and configured to permit a user to monitor, manipulate or manage the plurality of devices via a consolidated interface. The communications unit may be mobile or transportable.

The invention provides the user with a simplified, centralised mechanism for managing the devices associated with the unit. In one sense, the invention provides the operator with a 'dashboard' style interface which presents a consolidated view of the plurality of devices. The user can more easily view, monitor and/or manage the devices via an integrated interface rather than considering each device individually or consecutively, thus saving time and effort for the operator who no longer needs to switch between individual (and often technically very different) device interfaces in order to coordinate the unit's activities.

For the sake of clarity, it should be noted that the term 'interface' is not limited in this context to meaning simply a graphical user interface or visual presentation mechanism. While the invention does provide a visual representation to the user, this is only one aspect of the technical contribution made by the system and corresponding method. Rather, the invention can be thought of as a management or facilitation solution which enables the effective coordination of separate, and possibly otherwise incompatible, elements such that their functionalities can be utilised in a new and advantageous manner.

In effect, the invention provides a layer of abstraction between the user and the various hardware/software components such that the user is able to survey and harness the functionality of the components without being distracted or impeded by low-level, device-specific details.

The system provides a consolidated interface to enable a user to monitor, manipulate or manage the plurality of devices via the interface.

The plurality of devices may include a satellite support mechanism supporting satellite-related equipment provided in association with the unit. The satellite-related equipment may be a satellite dish or antenna.

The system may comprise a satellite controller component arranged and configured to enable a user to manipulate and/or re-orientate the satellite support mechanism via the interface. Thus, the satellite controller may be used to physically re-orientate or reconfigure the satellite equipment. For example, such that the satellite dish points in a different direction and/or is tilted at a different angle.

A variety of users may be able to access and/or view the devices via the integrated interface. For example, a manager in a remotely located headquarters or a service provider at a remote office may log into the system in addition to (or alternatively to) an operator sitting in the unit. This provides the advantage that data is shared amongst and available to all the parties who need it.

The communications unit may be a vehicle. The unit may be land-based or water-based (such as a ship or boat, for example). The unit may be a self-propelling vehicle such as an automotive vehicle e.g. a truck. Alternatively, the unit may be a trailer, welfare unit or a portable accommodation unit.

In some embodiments of the invention, the vehicle may be an emergency response vehicle, such as an ambulance, a police vehicle, a counter terrorist unit, a fire/rescue response vehicle or the like. Alternatively, the unit may be a non-motorised unit. The unit may be configured for use as a command centre or communications centre. The invention is not intended to be limited in respect of the type of unit with which it is used.

The plurality of devices may further include a telecommunication device, a mechanical device and/or a computing device. For example, the plurality of devices may include a telephone, a meteorological device, a compass, and/or a camera.

Preferably, the user is able to monitor, manipulate or manage the plurality of devices via the consolidated interface from a remote location relative to the unit.

Preferably, the system comprises at least one monitoring component arranged and configured to assess the current status of each (or at least some) of the plurality of devices. Preferably, the current status pertains to the orientation, position or operational state of the respective devices. For example, the operational state may be 'on', 'off' 'transmitting', etc. The position and/or orientation may relate to the physical configuration of the device—for example, the position or configuration of an antenna or satellite dish.

Preferably, the system comprises a presentation device for presenting the consolidated interface to the user. The presentation device may be a screen, computer monitor, or other graphical display device.

Preferably, the system comprises at least one monitoring component configured to control or adapt the status of at least one of the plurality of devices. The monitoring component may comprise a hardware device and/or software component.

Preferably, the consolidated interface comprises a representation of the current status of each device as assessed by the monitoring component. The representation may be an icon or other graphical representation of the device. The representation may be colour coded to illustrate or indicate the operational status of the device—for example, the device may be represented in green if switched on, or in red if switched off. Other visual means may be used to reflect or indicate the operational status of the device e.g. the icon may flash if a problem is detected with a particular device.

Beneficially, the consolidated interface comprises a navigation tool, such as a navigation bar. The navigation bar may comprise at least one icon representing a page to which the user can navigate. The page may present information relating to the activity and/or functionality of at least one of the plurality of monitored devices.

Preferably, the monitoring component comprises at least one software component and the system further comprises a microprocessor arranged and configured to execute the at least one software component.

Preferably, the at least one monitoring component is arranged and configured to receive data from the device and/or send data to the device.

Preferably, the at least one monitoring component is arranged and configured to detect whether data is being transmitted across a communications channel.

Additionally or alternatively, the monitoring component may be arranged and configured to:

detect or determine the operational status of a device (e.g. whether it is 'on' or 'off'); and/or monitor/measure weather-related parameters; this environment monitoring component may monitor and/or measure weather-related parameters such as data relating to, for example, the temperature outside the unit, wind speed outside the unit or any other environmental factor relating to the position of the unit; this information may be collected from weather station devices provided on or in the unit; and/or;

measure one or more operational parameters such as, for example, battery level, signal strength etc; these operational parameters may vary over time and thus require constant monitoring, or monitoring at timed intervals.

The monitoring component may comprise:

a power control software component arranged and configured to enable a user to power at least one device on and/or power it off; the power on/power off operation may be performed as a sequence of ordered tasks; for example, it may be required that one action is performed before another action can be or should be performed;

at least one hardware device provided to enable a user to control and observe the power state of the plurality of devices which are associated with the unit;

additionally or alternatively, the device may enable the user to power on/off the system of the present invention in the event that the software components have ceased to function. This feature may provide or facilitate the ability to configure the power state to 'transit' and/or 'depot' modes, for example, thus enabling equipment to operate under predetermined functions. The device may be a button, which may be pressed or pushed by the user; the button may be illuminated, flashing and/or coloured to indicate the power state of the devices; the power state may be, for example, 'on', 'off' or 'minimal', 'depot' or some other predefined level of functionality; and/or a satellite controller component arranged and configured to enable a user to manipulate, interrogate and/or re-orientate satellite-related equipment provided in association with the unit; and/or a call connect component arranged and configured to enable a user to manage, control or coordinate communications made via telephone and/or radio equipment provided in association with the unit; and/or a screen selector component arranged and configured to present a view of all video devices associated with the unit, along with their display outputs and configurations.

Preferably, the system further comprises a backup independent network capability and/or battery backup component. For example, it may comprise a 3G network capability or other technology suited for this purpose. This provides the advantage that, even in the event of power loss to the vehicle/unit, the system can still be contacted (e.g. by a support organisation) for diagnostic and repair purposes. For example, problems such as satellite link failure can be investigated and corrected even when the main means of contacting the monitored plurality of devices for remote support has failed.

Beneficially, the system may be arranged and configured to store data received from the plurality of devices and automatically upload said data to an alternative location. This data may be video, voice or other data. For example, the data gathered from the devices may be transferred to a server for back-up purposes. The server may be located remotely from the communications unit. The transfer of the data may be performed upon command by a user, or at a predetermined time, or at scheduled intervals. This feature provides the advantage that the data can be stored automatically, thus simplifying the role of the personnel operating the unit and ensuring that the back-up task is not over-looked.

Also in accordance with the present invention there is provided a corresponding computer-implemented method for managing or monitoring a plurality of devices provided in conjunction with a unit, the method comprising the step of permitting a user to monitor the plurality of devices via a consolidated interface.

The plurality of devices comprises a satellite support mechanism supporting satellite-related equipment provided in association with the unit.

The method also includes the step of providing a satellite controller component arranged and configured to enable a user to manipulate and/or re-orientate the satellite support mechanism via the interface.

The unit may be a mobile communications unit. Additionally or alternatively, it may be a vehicle. The unit may be land-based or water-based (such as a ship or boat, for example). The unit may be an emergency response vehicle such as an ambulance or police vehicle. Alternatively, it may be non-motorised. It may be a trailer, welfare unit or the like. The unit may be an incident command unit.

The method may further comprise the steps of
providing at least one hardware or software-based monitoring component arranged and configured to assess the current status of at least one of the plurality of devices;
presenting the consolidated interface to the user on a presentation device, the interface comprising a representation of the current status of at least one of the devices as assessed by the monitoring component.

Additionally, the method may further comprise the step of providing at least one hardware or software component configured to control or adapt the status of at least one of the plurality of devices.

These and other aspects of the present invention will be apparent from and elucidated with reference to, the embodiment described herein.

The invention will now be further described by way of example only and with reference to the accompanying drawings, in which.

An exemplary embodiment is now described in relation to an incident control unit. However, it should be noted that the invention may also be implemented in a variety of other contexts; for example, it may be installed on a boat to provide an improved mechanism for monitoring and/or interacting with the boat's diverse pieces of equipment.

Major incidents such as disasters and terrorist attacks often affect wide geographical areas and last for a significant length of time. These factors can place huge demands on emergency/response management organisations and their resources, whether those organisations are working alone or in partnership with other agencies. Within such high-pressure environments it is crucial that clear command communications are established and maintained within a very short space of time from the arrival of the emergency services.

Figure 1:
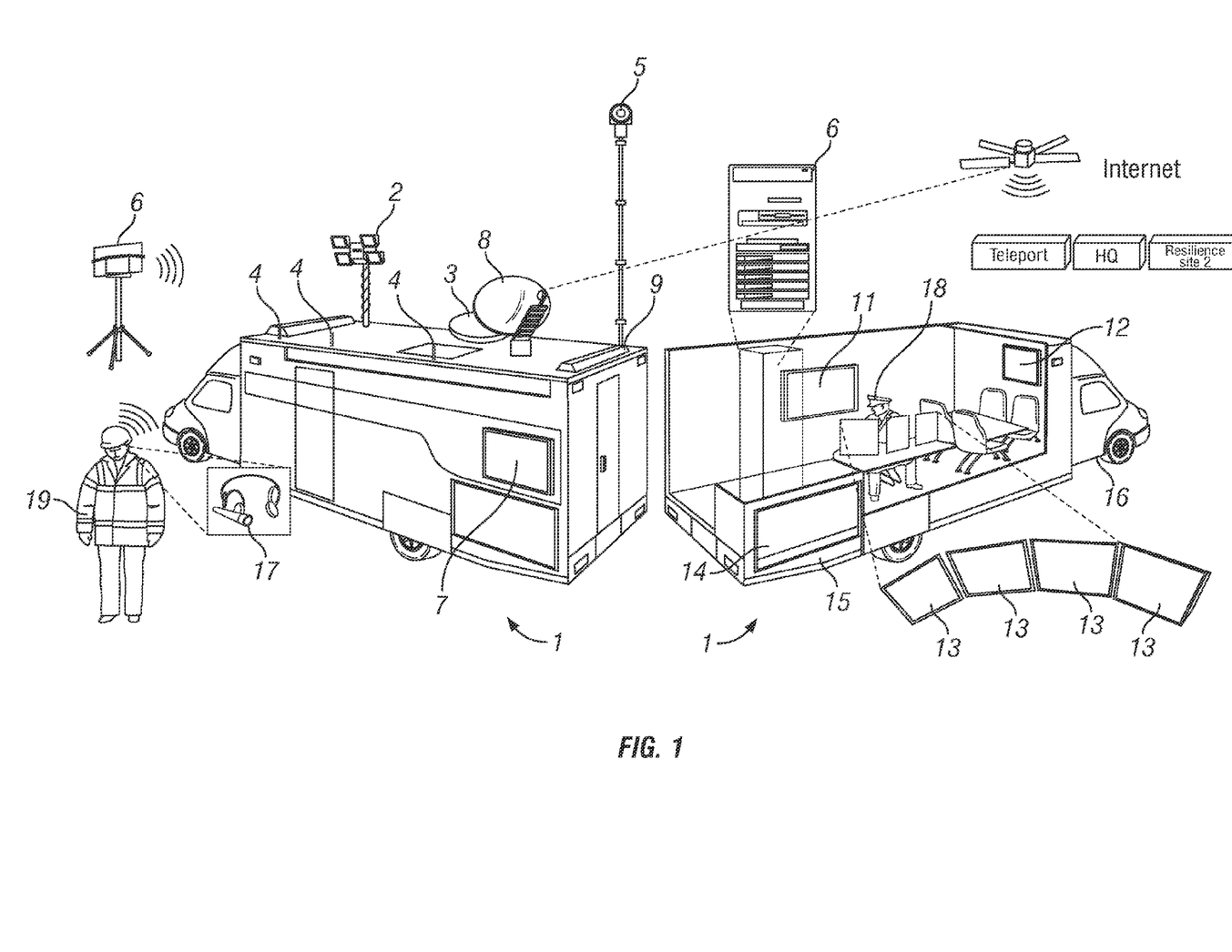
FIG. 1 shows an external and an internal view of a mobile communications unit.

In such circumstances, a control/communications unit 1, ICU, such as that of FIG. 1 is provided with communications facilities for management of such incidents. Such units 1 provide 'command post' infrastructure via converged communications (broadband internet, fax, intranet, voice and video, data and other wireless capabilities).

Turning to FIG. 1, a illustrative embodiment of the invention is shown. A typical mobile communications unit 1 is illustrated having a variety of devices provided thereon. The unit is a vehicle provided with satellite broadband and wireless communications capabilities. The exterior of the illustrative vehicle shown in FIG. 1 is provided with
lighting equipment 2 to illuminate a poorly-lit scene, for example at night;
a satellite dome 3 for receiving signals such as satellite television signals;
wireless, WiFi, GSM antennae 4;

optical/thermal imaging camera 5 on a pneumatic, telescopic mast;

wireless nodes 6 to extend the signal range for communications;

a touch screen 7 provided on the exterior of the vehicle; this may be used for staff and personnel briefings;

VSAT satellite antenna 8;

a weather station 9 for detecting/monitoring wind speed and direction, for example;

The interior of the illustrative vehicle shown in FIG. 1 is provided with a rack for housing PCs, video and data storage servers 10;

smart board/touchscreen 11;

television screen or other presentation devices 12;

four computer monitors 13 on main control desk:
SAT: satellite information and controls;
VSR: video server recorder;
PC1: main operational screen;
PC2: secondary operational screen;

Generator compartment 14;

Power socket compartment 15;

Auto eject power sockets 16.

In addition, body-worn cameras 17 having remote transmission facilities may be worn by field personnel 19 as shown in FIG. 1. These devices may utilize a variety of transmission standards including COFDM, wireless, GSM and 3G to suit the purpose and levels of resilience required.

Other items of equipment may be provided in addition to those shown in the illustrative embodiment. The type and number of devices provided will be chosen in accordance with the operator's needs.

The present invention provides a common user interface such that an operator (user) can control and monitor the various technology devices via a centralised mechanism. It does this by employing various software and hardware integrators, utilising existing Application Programming Interfaces (API) where available and interface grooming where required. Thus, the invention is arranged to provide a consolidated view of the various devices to the user at the 'front end' whilst communicating with the devices at the 'back end'.

The system employs backend, or server side, daemonised processes which are invisible to the user for continuous monitoring and control of hardware devices; this software also provides the API for the front end software to interface with.

The front end of the system is the user interface and runs within an internet browser application. The front end relies on the backend software to provide data for display, to accept commands from the user and to effect changes upon hardware devices.

In use, the user is provided with various functional components which enable the user to perform various tasks in respect of the devices. These functionalities will now be described.

System Status Component

Figure 2:
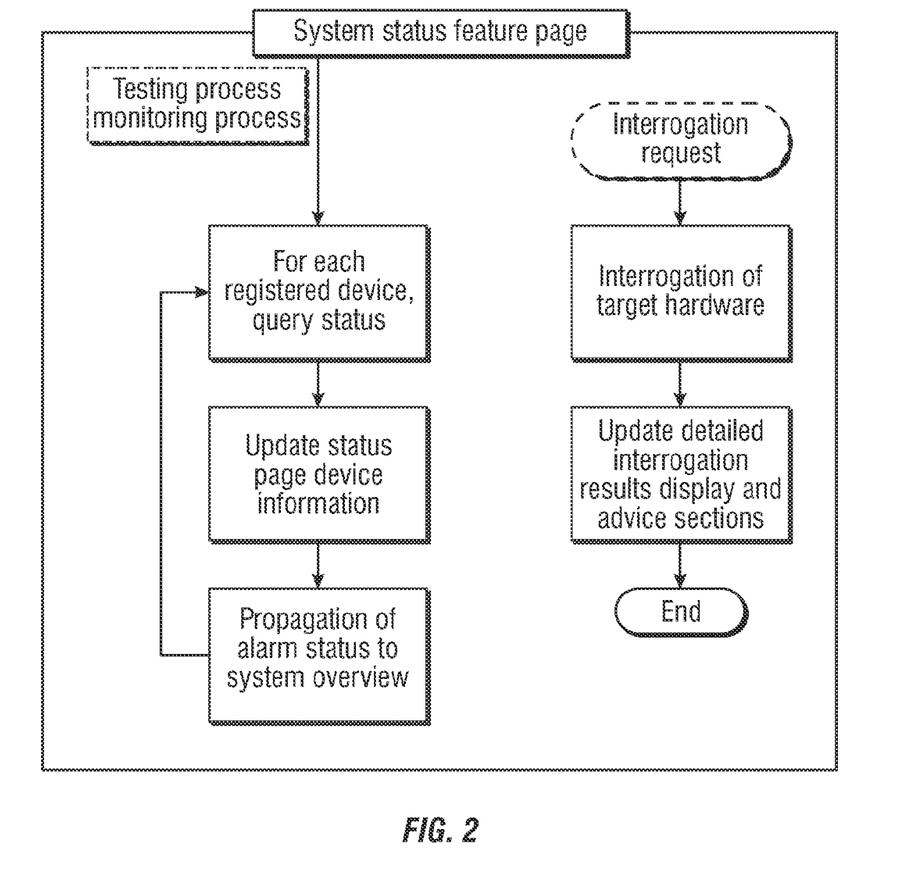
FIG. 2 shows an overview of the system status component.
Figure 4:
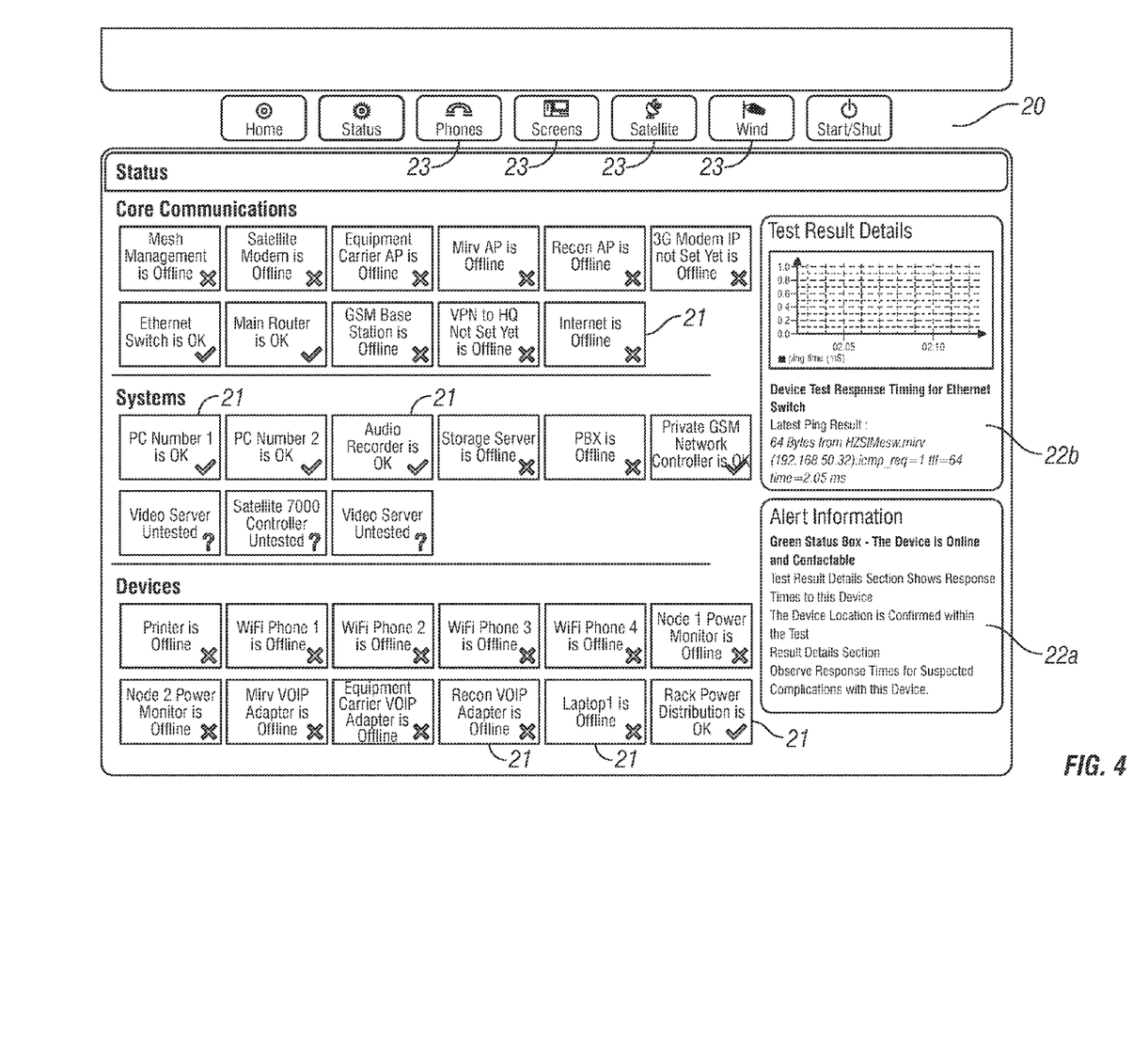
FIG. 4 shows an example screen shot of the 'system status' page of the illustrative embodiment.

An overview of this feature is shown as a flowchart in FIG. 2. An example screen shot of the system status page is shown in FIG. 4.

This component provides an overview of the status of the devices provided on the vehicle and enables detailed device interrogation of the associated devices. Devices are shown as icons 21 or representation displayed on a screen. The icons may be colour coded to reflect the operational status of a device 21. For example, if a particular item of equipment 21 is switched on and functioning normally, it may be shown as a green icon. Alternatively, if it is powered off, or there is a problem with the device, it may be represented in red. This provides the advantage, amongst others, that the operator 18 can see quickly and easily, and identify at a glance, which devices are functional and which need attention. The operator does not need to interrogate each device individually in order to monitor, assess and manage the plurality of devices.

The system status component enables:

concise presentation of operational essential devices

Identification of Core communications, computer systems and peripheral devices

Viewing of the functional state of devices, online status and network connectivity Generation of a detailed report on device interrogation Monitoring of wireless mesh nodes 6 connectivity and battery levels Performance of remote diagnostics (e.g. by a service provider who is situated in another geographical location).

The system status page displays a visual overview of all monitored vehicle systems and features, providing a "Dashboard-like" status of the vehicle. This feature can interrogate a wide variety of technologies by appropriate methods, automatically updating status information for many devices. This information can be made available to suitably authenticated parties at remote locations. This can be presented as a 'home page' which provides an overview of the various devices provided on the vehicle, as shown in FIG. 4. Other information, such as alert information 22a or test result information 22b may also be displayed.

The interface also comprises a navigation bar 20 which is used to alert the user to any device-related activity which may have occurred in respect of applications or devices. For example, if an application is running in the background, any change in application or device status is brought to the user's attention via this feature. The navigation bar 20 includes icons 23 representing functional groupings of the various devices. Each icon represents a page which the user can navigate to, the page then showing detail relating to the activity of a particular device or group of devices. The icons are colour coded to indicate the status of the device (e.g. green for 'on') and may pulse or flash if a change in status has occurred. For example, if a device (or group of devices) has suddenly lost power, the icon 23 representing the page relating to this device in the navigation bar may pulse red, which will attract the user's attention. The user can then select the appropriate interface page relating to the device(s) to find out more information relating to the activity. The user may then interrogate the device or investigate further and take any necessary remedial action. For example, if the system is indicating that there has been some activity relating to a telephone device (e.g. a change in status, or a problem relating to that piece of equipment), the user can click on the 'phones' icon in the navigation bar 20 to jump to the 'phones' page which will show more detailed information relating to the status of the telephone device(s).

As well as providing immediate diagnostic information and rectification advice for known classes of issues, the status page aids in rapid support call identification of faults and their remedies; this increases first time fix rates, improves pre-site-visit information and leads to improved "up time" where the vehicle 1 is in full operational capability.

The backend software for the system status feature makes use of specific technologies to leverage information about a device. Most devices respond to standard network-based interrogation and this is the baseline method used in the exemplary embodiment. The ability to extend this baseline to account for specific devices or protocols has been a significant principle in the development of the present invention.

The backend software for the status feature forms part of the core software of the invention. Other system features depend on this software component, usually invisibly, but the system status feature displays these results to the user as a system overview.

The implementation of this component can be expressed at high level as follows.

Background Code Services

Testing Process
Run forever
For each device under test
   For each testing method for device
     Execute (device,method) test
     Parse test results generating status condition
     Cache (device,status) results
       Cache maximum alert level max(current,results)
Interrogation Process
On demand (device,status)
For each interrogationmethod for (device,status)
   Execute (device,interrogationmethod) test
   Parse test results generating detailedstatus condition Status Page Services Monitoring Process
Run forever
For each device to be monitored
   Query Testing process with device for cached status
   Update feature page device element with cached status
Query Testing process maximum alert
Update system alert status for feature as maximum alert
Interrogation Request
On Device Mouse-Click
Query Interrogation process with(device,status)
   Update feature page detailed information and advice sections, including cached historical performance data Screen Selector Component This component shows a view of all video sources associated with the vehicle, along with display outputs and current setup. It provides
   The ability to switch display of video sources between screens
   Pre-configured common actions and screen configurations
   Intuitive control for displaying video sources on desired displays
   The ability to permanently assign specific inputs to displays The screen selector is a software interface to video signal switching and distribution systems. It presents to the user a clear and concise control that is tailored to the specific vehicle setup and has been developed in direct response to user/operator requirements. This control can be extended to suitable connected devices outside the vehicle, enabling the display on external screens 7 to be manipulated during outside briefing etc.

The screen selector feature interfaces with a video distribution system, providing control commands and reading status information. The user interface is tailored to the devices available and visually indicates the connectivity information. This device may be provided as a hardware module although the skilled addressee will understand that it could alternatively be developed as software only, providing the host has a suitable interface available, such as RS422.

Screen Selector Page Services

Figure 5:
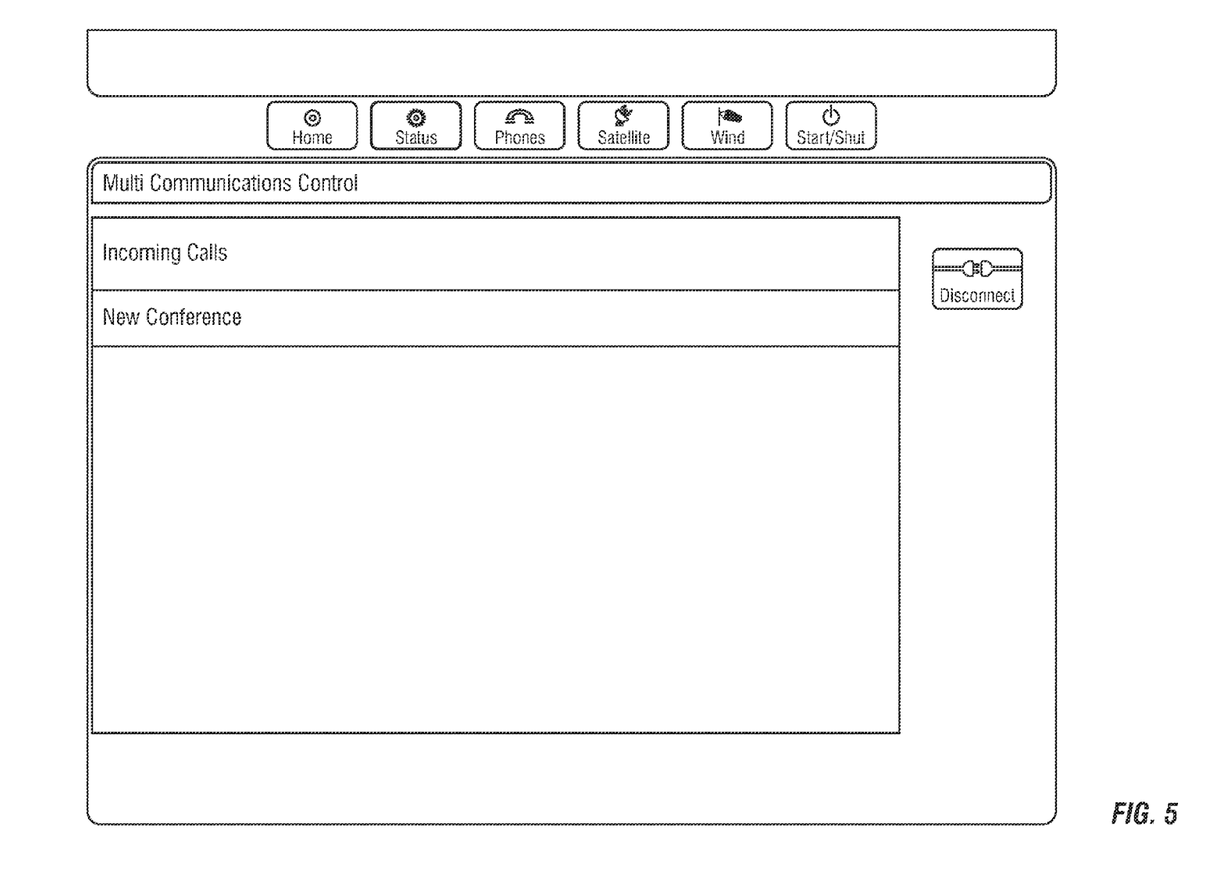
FIG. 5 shows an example screen shot of the 'call connect' page of the illustrative embodiment.

Display Change
On demand (source,output)
Interpret mouse interfaces as command request
Command send to hardware interface (source,output)
Hardware interface relay command to display distribution hardware Run Forever
Query video switching device for current (source and output) configuration
Update screen display to reflect current video switching device configuration Call Connect Component This component serves as the vehicle's telephone and radio call control centre. An example screen shot of the 'call connect' page is shown in FIG. 5. This page would be arrived at after the user has clicked on the 'phones' icon 23 in the navigation bar 20.

The call connect component enables patching to multiple devices such that, for example, radio-based communications can be patched through to mobile or land line telephone devices. The functionality of this feature includes:
   Placement of calls between vehicle phones
   Patching of calls via vehicle mobile network
   Patching of calls via integrated radio channels and external telephone networks
   Creation of conferences between any calls, including analogue radio channels The call connect page is the voice call centre for the inventive system. It is the call connect feature that enables a vehicle to serve as the single point of contact for command centre headquarters, field personnel and other agencies in any scenario. During an incident, it is crucial that vital information is passed to command centres. If desired, the call connect facility may be configured for administration by a remote operator, freeing the vehicular operators 18 for other tasks.

The call connect feature provides a user interface to a Private Branch Exchange (PBX) device. Connectivity information is collected from the PBX and displayed as an operator interface to the user. Call commands are sent to the PBX to instigate changes such as placing or connecting calls. In essence, an operator is able to patch incoming calls from one type of technology through to another type of technology. Multiple conference calls are also capable of being operated simultaneously.

Call Connect Page Services

Call Monitor
Run Forever
Login to PBX phone system
Query PBX phone system for initial status Loop forever
    Query PBX phone system for call status information
    Update feature page with call status changes
Call Control
On Demand (Request)
Interpret mouse interface as command request
Construct PBX command set
Instruct PBX with command set

Satellite Controller Component

Figure 8:
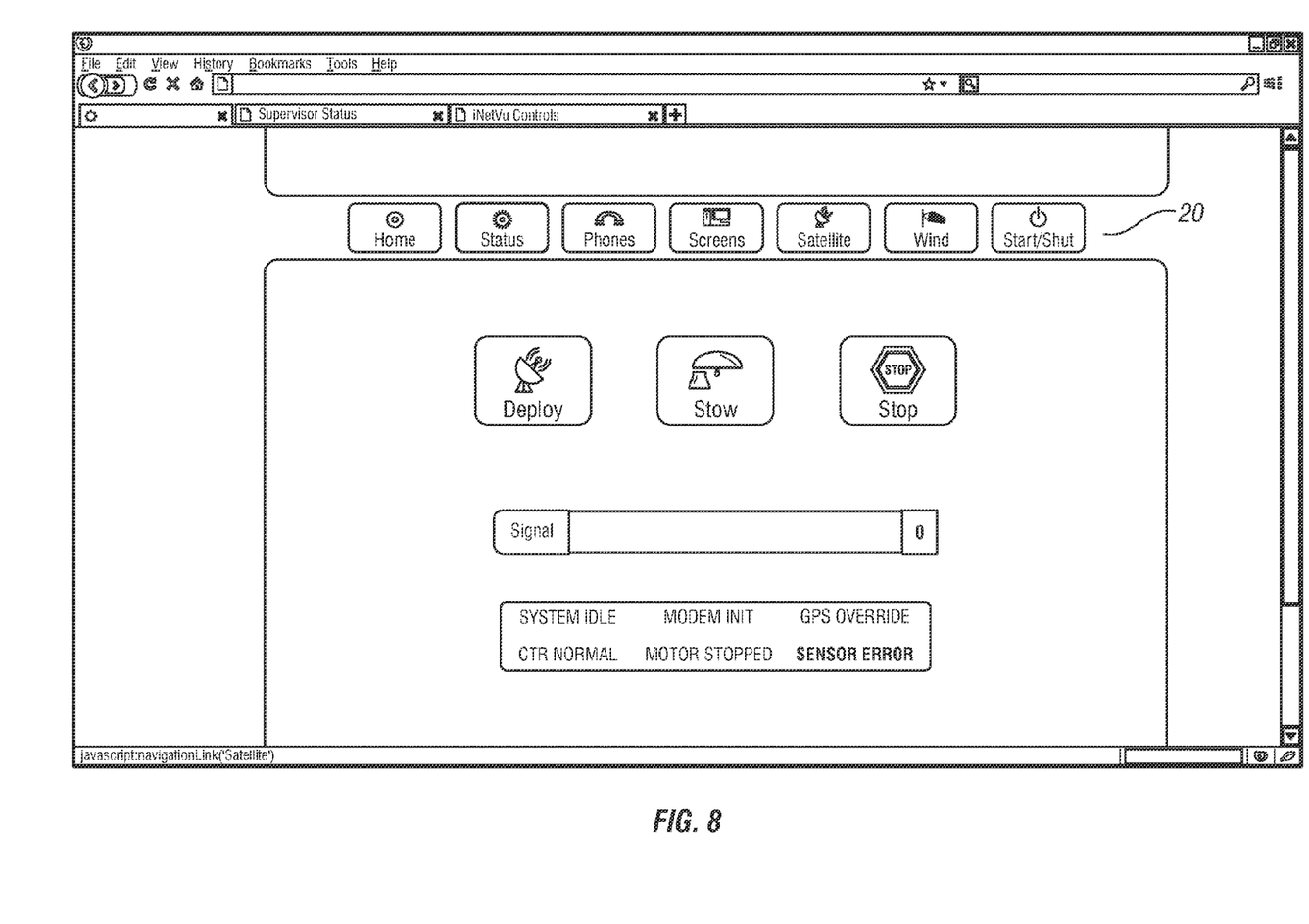
FIG. 8 shows an example screen shot of the 'satellite control' page of the illustrative embodiment.

This enables the user to control of the satellite system easily via the clickable icons/buttons displayed on the screen. An example of the satellite control page is shown in FIG. 8, and can be jumped to by the user by clicking on the 'satellite' icon in the navigation bar 20.
    Deploy the satellite to connect the broadband
    Stow the satellite to its home position for transport
    Monitor signal strength and connection condition
    Perform administrative tasks via an advanced menu
This feature brings a software interface from the satellite controller to the user's command position 18. There is one button to deploy and connect, one button to stow the receiver. Added benefits from this feature are a clear signal strength indication and an orientation feature which shows the antenna azimuth and any blind-spots from other hardware on the vehicle roofline. Thus, the satellite equipment can be easily reconfigured and/or positioned by the user via the interface.

This feature significantly aids the user by ensuring that the satellite platform has no obstructions and therefore clear line of sight to lock on.

Satellite communication systems are core hardware within an ICU. This feature reflects this importance, providing ease of use and control.

The details of the satellite connection conditions monitored by this feature can be made available to remote support staff; this can be invaluable for diagnosis of connectivity issues.

The system also comprises a 3G network capability and battery backup. Therefore, even in the event of total vehicle power loss the system can be contacted (e.g. by a support organisation) for the purpose of diagnostics and possible remote repair. This enables the diagnosis and identification of the cause of problems such as satellite link failure, even when the main means of contacting the vehicle equipment for remote support has failed.

Satellite Control Page Services

Satellite Monitor
Run Forever
Query Satellite controller for status information
Update feature page with status details
Satellite Control
On Request (command)
Instruct satellite controller with command

Power Mode Component

Figure 3:
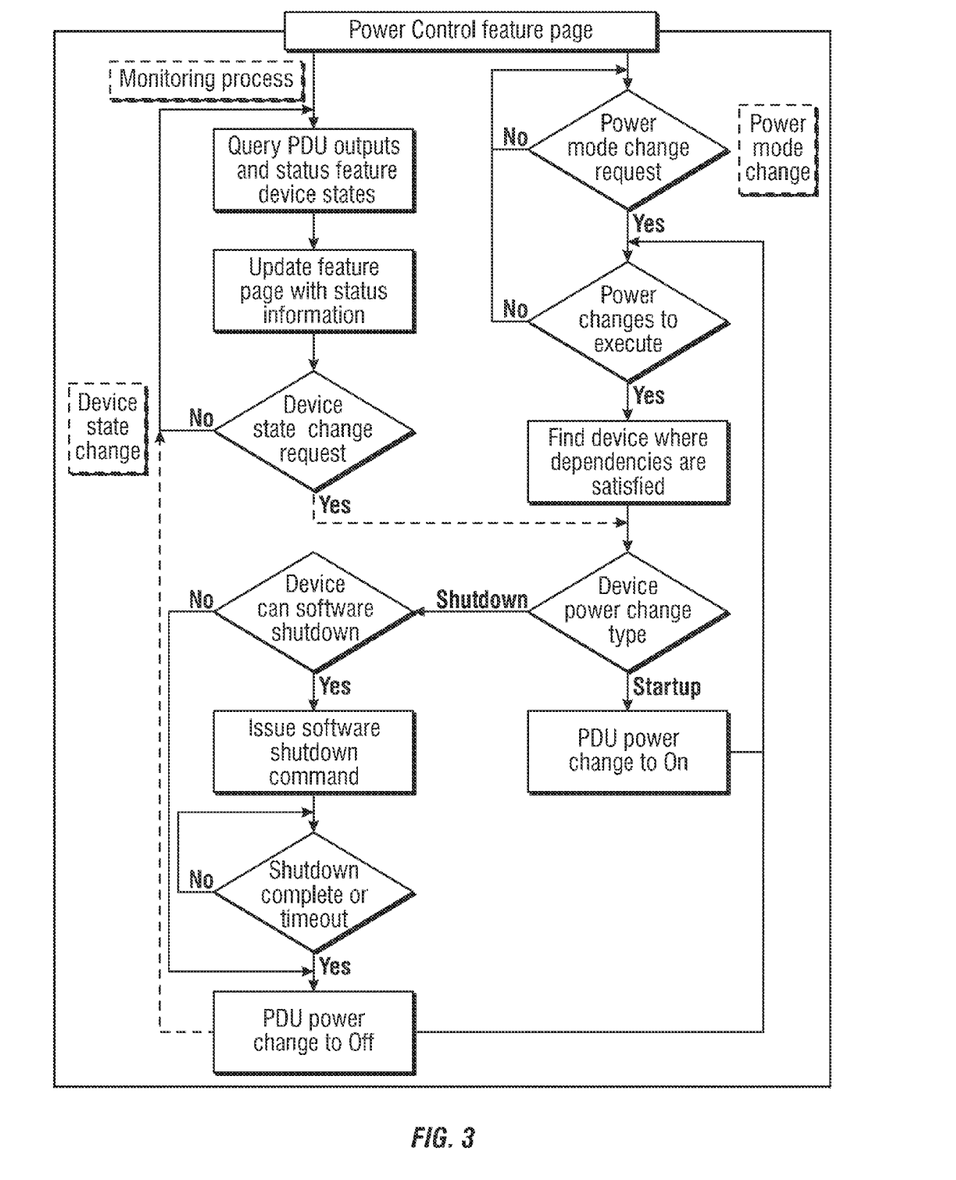
FIG. 3 shows an overview of the power control page services.
Figure 6:
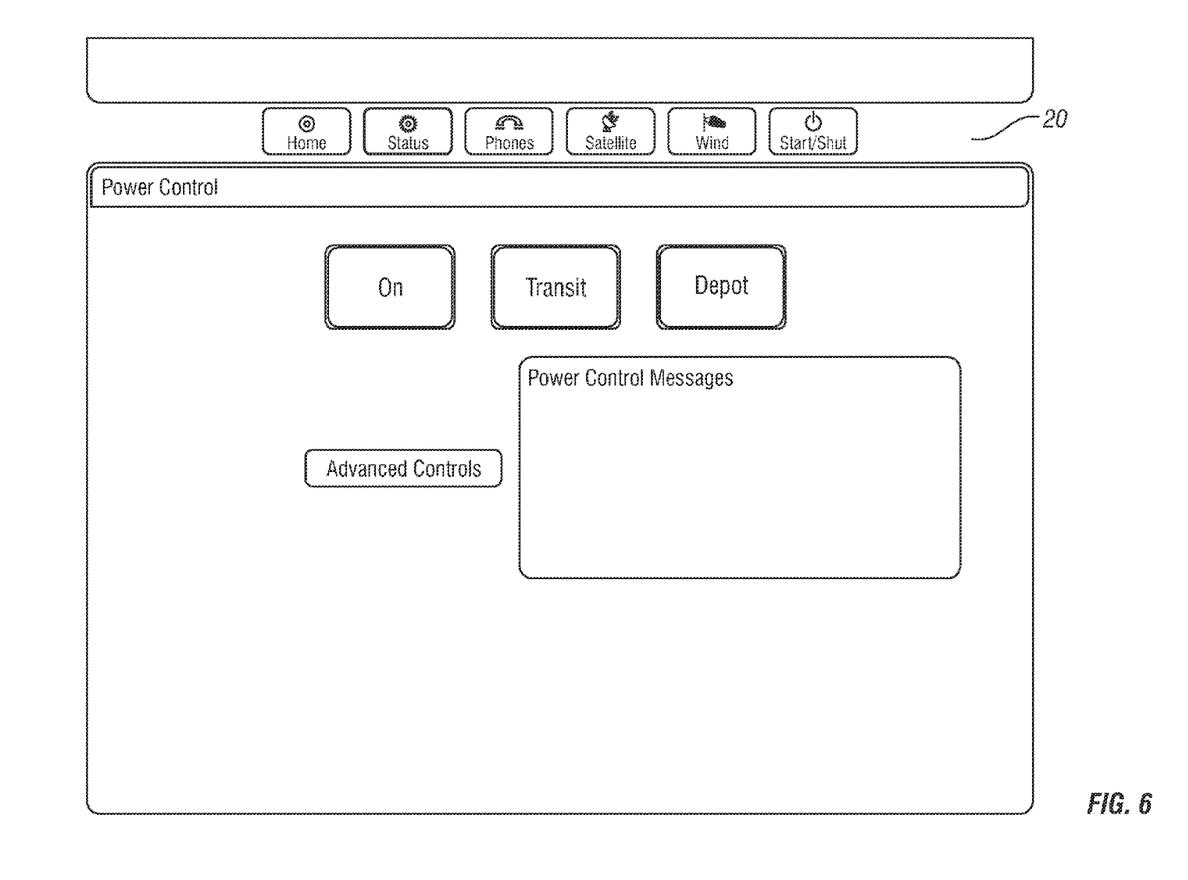
FIG. 6 shows a first example screen shot of the 'power mode' page of the illustrative embodiment.
Figure 7:
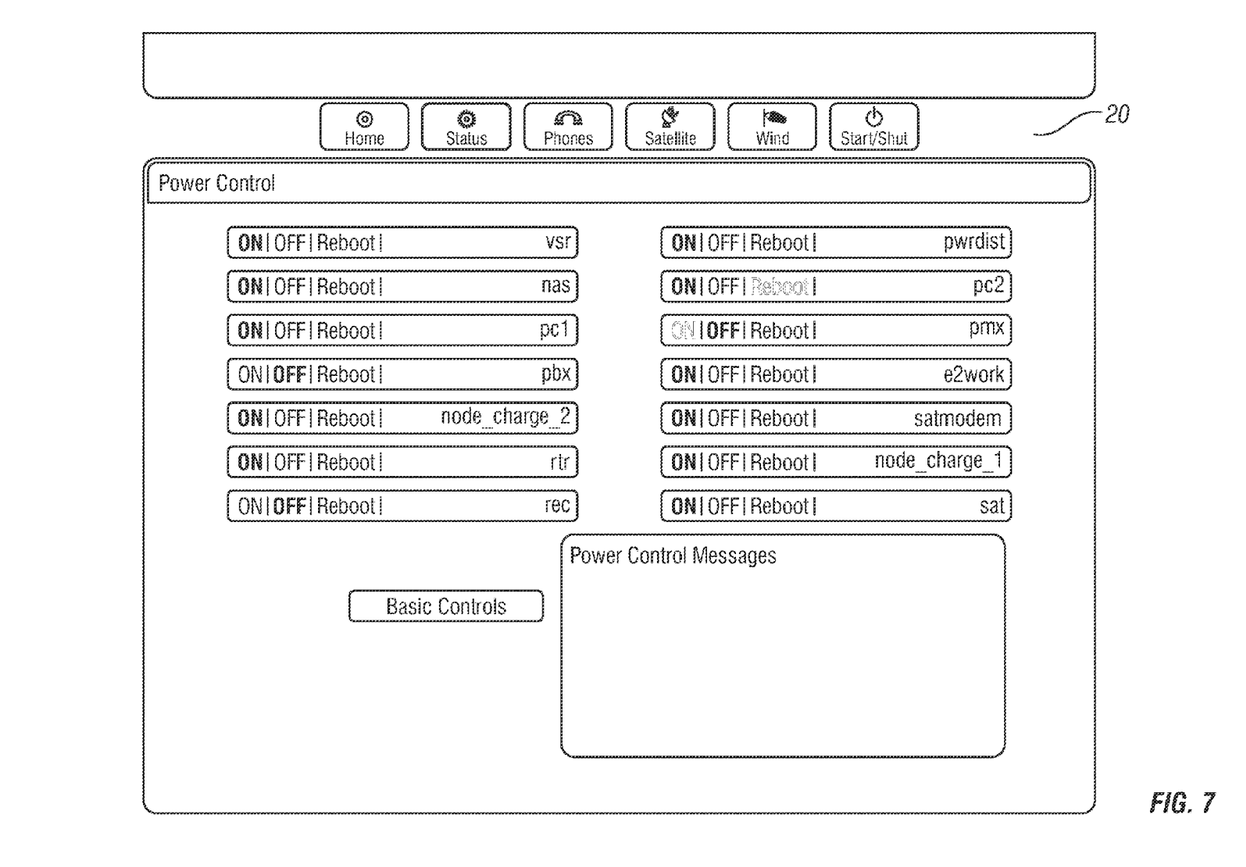
FIG. 7 shows a second example screen shot of the 'system status' page of the illustrative embodiment.

An overview of this component is shown as a flowchart in FIG. 3. Examples screen shots of the basic power control screen and advanced power control screen are shown in FIGS. 6 and 7 respectively.

This components enables the user to control the startup, shutdown and power mode of vehicle systems. Functionality includes
    Switching between defined power modes
    Controlling startup and shutdown of vehicle systems whilst respecting device dependencies
    Safe shutdown of vehicle operating systems Power is the bedrock for all installed technologies. Bringing systems into action, and switching them out of action, must be handled correctly. This feature makes changing power states a simple and robust process. With full control of power states users are able to safely command the vehicle into specific modes of operation. This then enables offline tasks to be performed without the requirement to monitor and revisit the vehicle after scheduled tasks have been completed. As the incorrect shutdown of vehicle operating systems can be a cause of device failure, this feature greatly reduces the risk of such failures and the associated "downtimes" where the vehicle is not in full operational capacity.

The power control feature of the invention is designed to provide software automation of hardware devices as a set of dependant items. Instead of many separate devices being controlled individually this feature presents a single system that operates in distinct modes. Traversal between modes is conducted in an orderly fashion based on the dependencies between devices.

The common element to all devices in this respect is power, which this feature controls by a power distribution switching unit. Many devices require specific actions to be performed before power is disconnected and this software component orchestrates prerequisites invisibly to the user. Thus, the various tasks can be performed sequentially in the order required. The usual prerequisite is an operating system shutdown.

The system comprises a control box having a front panel. The front panel features illuminated push buttons grouped as follows.

A group of three buttons which can be used to command the system to set the power state of the equipment under control and, via button illumination, to observe which power state the equipment is in. Each button is used to command a transition:
    "Off": when pressed this button commands the system to shut down all systems/devices in a controlled and safe fashion according to a programmed order. During the transition towards the "off" state the illumination in the button flashes red and illumination is removed from all other buttons in the group. Once the "off" state is confirmed to have been reached then the illumination stays a steady red;
    "Minimal": When this button is pressed the system is commanded to transition to a state whereby only a pre-programmed subset of equipment is operating. For example one PC, it's monitor, a NAS server and the air conditioning system might be a pre-determined minimum for a vehicle parked up in a standby state. The button illumination flashes green during transition to this state and any illumination of other buttons in this group is removed. The illumination stays steady green once this state has been reached;
    "On": When this button is pressed, the system is commanded to transition to a state whereby all monitored systems/devices are powered on in the appropriate sequence. During transition to this state all illumination is removed from other buttons in this group and the "on" button illumination flashes green. Once system tests verify that all systems are powered up successfully the illumination stays solid green; instead of 'on', the label 'full' may be used to describe this state wherein all monitored devices/systems are fully operational.

Another illuminated button is used to indicate whether the system itself is powered on and whether the monitoring software is running correctly. The button can also be used to power on the system itself and to reboot it in the case that the software within has stopped operating, or to initiate a power up of the system if it has been completely shut down. The action of the button is enabled or disabled by a separate watchdog timer circuit which is powered by an auxiliary power output from the system, and also acts upon the receipt of a regular series of timed pulses from another GPIO (general purpose input/output) output on the system that is toggled by a routine running within the monitoring software. In the normal running condition, the pulse will regularly reset the timer and the circuit causes the button to light up a steady green. In this condition, the button has no effect on the system. If the pulse train stops being sent and the system output remains in either a high or low state for too long (i.e. the software is no longer running) the timer will cause the button to light up red (indicating a system fault) and also enable the button, which can then be used to power the system off and on again to see if this rectifies the fault condition. If there is no illumination then this indicates that the system is powered down. In this condition, the button is also enabled and can be used to initiate power up of the system. Thus, in summary, if the light is green then the system is functioning as expected and pressing the button has no effect; if the light is red then something is amiss with the system and the button can reset it; if the light is off then the button can be used to power up the system.

FIGS. 6 and 7 illustrate the power control pages. FIG. 6 shows the basic power page which allows the user to click on an icon or button to choose to put the vehicle into 'on' (or fully operational) mode, 'transit' mode (when power is maintained to certain core applications such that data can still be received/stored/transmitted), or 'depot' mode (when stored data is uploaded to the central server. By clicking on the 'advanced' icon, the user will be taken to the advanced power control page illustrated in FIG. 7.

The advanced power control page displays icons representing each individual device to allow the user to manually control each separate power source. Each icon allows the option of 'on', 'off' or 'reboot' for each device. By clicking on the 'basic controls' page, the user will return to the screen shown in FIG. 6.

Power Control Page Services

Monitoring Process
Run forever
For each controlled device
   Query PDUwith device for outletpower
   QueryTesting process with device for status
   Update feature page with device, outlet power, status
Device State Change
On demand (device,mode)
If startup==mode
   CommandPDUwith (device,power on)
Else shutdown==mode
   QueryMonitoring process with device for status
   If online==status AND devicecan 'software shutdown'
     Issue software shutdown command
      Wait while (NOT timeout) AND online==devicestatus
   CommandPDUwith (device, power off)
Power Mode Change
On demand (power mode)
   Compare configuration power mode with current device power states
   While device power state changes left to execute
     For each device
       Query config for device power state dependencies
       If devicedependencies are satisfied
         Call Device state change with (device,mode)

Therefore, the invention provides a management tool which interfaces with various forms of known devices. This managerial solution is not provided in US2007/149120 A1 (Money, described above) although it could be used in conjunction with the system described in Money to consolidate all of the individual elements and present information and control in a centralised form, thus enhancing the usability of the system's devices and saving time and effort for the user. This centralised information and control would then be accessible from any networked computer via a web browser.

In this sense, the invention serves as an umbrella over the existing products and systems to allow the relevant information and control to be easily accessible to the operator without the need to interface with lots of individual systems. The invention does not replace these systems/devices, which can still function independently in the case that the invention fails.

For example, with respect to the satellite control page the invention interfaces with an existing satellite system. The satellite can still be deployed by the controller that is provided by the satellite manufacturer. The invention takes only the information and control buttons that are needed for day to day operational tasks and displays them in a simplistic form to the user, alongside the information from the other devices e.g. power, weather, status etc.

Thus, the present invention provides numerous advantages:

Provides a centralised overview of the various status of vehicle systems and enables detailed device interrogation;
Provides a layer of abstraction between the user and the various hardware/software components such that the user is able to consider and harness the functionality of the components without being distracted by low-level, device-specific details.
Concise presentation of operational essential devices
Identification of core communications, computer systems and peripheral devices
Enables efficient and swift interrogation of the functional state of devices, online status and network connectivity
Detailed report on device interrogation
Wireless mesh nodes connectivity and battery levels
Enables remote diagnostics
Provides a single, centralised interface showing the variety of devices provided in connection with the communications unit 1; the operator 18 does not have to juggle a variety of different interfaces or communicate with each device via an independent interface;
provides a simple overview, 'dashboard' style, of the various unit components, making the operator's tasks easier to perform;
Provides a consistent user interface whether locally or remotely administered
Provides touch screen aware operational design
Ensures that vital and updated information is brought to the operator's attention
Provides at-a-glance 'traffic light' system status
Provides configurable remote user monitoring and control of vital systems;

Provides a means of automatically uploading data gathered from the various devices to another location such as command headquarters or a control room;

Provides an alert system for automatically identifying activity on each page, even if that activity has occurred in the background.

Herein, the term 'computer-implemented system' is used to refer to a system wherein at least one component of the system is, or is influenced/controlled by, an electronic computing device such as a suitably programmed microprocessor. Similarly, the term 'computer-implemented method' is used to refer to a method wherein at least one step of the method is performed by, or is influenced/controlled by, an electronic computing device such as a suitably programmed microprocessor.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

Embodiments of the present application are not limited to any particular operating system, mobile device architecture, server architecture, or computer programming language.

The invention claimed is:

1. A computer-implemented system arranged and configured to communicate with a plurality of devices provided in association with a unit comprising:
    a consolidated interface to enable a user to monitor, manipulate or manage at least one of the plurality of devices via the interface using a dashboard-style view of the devices displayed on a screen;
    at least one monitoring component configured to control or adapt the status of at least one of the plurality of devices; and
    a satellite controller;
    wherein at least one of the plurality of devices includes a satellite support mechanism supporting satellite-related equipment provided in association with the unit; and
    wherein the satellite controller component is arranged and configured to enable a user to manipulate and/or re-orientate the satellite support mechanism via the dashboard-style view of the interface such that the satellite-related equipment points in a different direction and/or is tilted at a different angle.

2. The system according to claim 1, wherein the unit is selected from the group consisting of an incident command unit, a mobile unit, a vehicle, a fixed structure and an emergency response vehicle.

3. The system according to claim 1, wherein at least one monitoring component is arranged and configured to assess the respective status of at least one of the plurality of devices.

4. The system according to claim 3, wherein the monitoring component configured to control or adapt the status of at least one of the plurality of devices is the same as the monitoring component arranged and configured to assess the respective status of at least one of the plurality of devices.

5. The system according to claim 3 further comprising a microprocessor arranged and configured to execute at least one monitoring component.

6. The system according to claim 3, wherein at least one monitoring component is arranged and configured to receive data from at least one of the devices and/or send data to at least one of the devices.

7. The system according to claim 3, wherein at least one monitoring component is arranged and configured to perform one or more of:
    detect whether data is being transmitted across a communications channel;
    detect whether a device is operational or not operational; and
    measure one or more operational parameters.

8. The system according to claim 1, wherein the status of a device pertains to the orientation, position or operational state of the device.

9. The system according to claim 1, wherein at least one device of the plurality of devices is selected from the group consisting of a telecommunication device, a mechanical device and/or a computing device.

10. The system according to claim 1 wherein at least one monitoring component is selected from the group consisting of:
    a power control component arranged and configured to enable a user to power at least one device on and/or power it off;
    a call connect component arranged and configured to enable a user to manage, control or coordinate communications made via telephone and/or radio equipment provided in association with the unit;
    a screen selector component arranged and configured to present a view of all video devices associated with the unit, along with their display outputs and configurations; and
    an environment monitoring component arranged to monitor and/or measure data relating to the environment in which the unit is located.

11. The system according to claim 1 further comprising one or both of a backup independent network capability and battery backup component.

12. The system according to claim 1 further comprising at least one input device operable to set the power state of at least one of the plurality of devices or the system itself.

13. The system according to claim 12, wherein at least one input device is a button or switch arranged and configured to illuminate and is configured to provide a visual indication of the power state of at least one of the plurality of devices or system.

14. The system according to claim 1, wherein the system is arranged and configured to store data received from at least one of the plurality of devices and automatically upload said data to an alternative location.

15. The system according to claim 1, wherein the consolidated interface comprises a navigation tool, the navigation tool comprising at least one icon representing a page to which the user can navigate, the page presenting information relating to the activity of at least one of the plurality of monitored devices.

16. The system according to claim 1 further comprising a presentation device for presenting the consolidated interface.

17. The system according to claim 16, wherein the presentation device comprises a graphical display device.

18. The system according to claim 1, wherein at least one monitoring component comprises one or both of a hardware device and software component.

19. The system according to claim 1, wherein the consolidated interface comprises a representation of the status of each device as assessed by at least one monitoring component.

20. The system according to claim 19, wherein the representation comprises a graphical representation of the device.

21. The system according to claim 1, wherein the user can monitor or manage at least one device of the plurality of devices via the consolidated interface from a remote location relative to the mobile communications unit.

22. The system according to claim 1, wherein at least one device of the plurality of devices is selected from the group consisting of a telephone, a body worn-camera, a touch screen, an antenna, a meteorological device, a compass, and a camera.

23. An incident command unit comprising the computer-implemented system of claim 1 arranged and configured to manage, manipulate or monitor at least one of the plurality of devices provided in association with the incident command unit.

24. A computer-implemented method to manage, manipulate or monitor a plurality of devices provided in conjunction with an incident command unit, the method comprising:
permitting a user to monitor at least one of the plurality of devices via a consolidated interface using a dashboard-style view of the devices displayed on a screen;
controlling or adapting the status of at least one of the plurality of devices with at least one hardware or software component; and
enabling a user to manipulate and/or re-orientate a satellite support mechanism via the consolidated dashboard-style view of the interface with a satellite controller component, such that at least one of the plurality of devices points in a different direction and/or is tilted at a different angle;
wherein at least one of the plurality of devices includes the satellite support mechanism supporting satellite-related equipment provided in association with the incident command unit.

25. The method of claim 24, wherein the incident command unit is a vehicle.

26. The method of claim 24 further comprising:
assessing the current status of each of the plurality of devices with at least one hardware or software-based component; and
presenting the consolidated interface to the user on a presentation device, the interface comprising a representation of the current status of each device as assessed by at least one component.

27. A computer-implemented system arranged and configured to manage, manipulate or monitor a plurality of devices provided in association with a water-based vehicle, such that a user is able to monitor or manage the plurality of devices via a consolidated interface using a dashboard-style view of the devices displayed on a screen, wherein:
the plurality of devices includes a satellite support mechanism supporting satellite-related equipment provided in association with the water-based vehicle;
the system comprises at least one component configured to control or adapt the status of at least one of the plurality of devices; and
the system comprises a satellite controller component arranged and configured to enable a user to manipulate and/or re-orientate the satellite support mechanism via the consolidated interface such that the satellite-related equipment points in a different direction and/or is tilted at a different angle.

28. A computer-implemented system for managing, manipulating or monitoring a plurality of devices provided in association with a communications unit, the system being arranged and configured to permit a user to monitor or manage the plurality of devices via a consolidated interface using a dashboard-style view of the devices displayed on a screen, such that at least one of the plurality of devices points in a different direction and/or is tilted at a different angle, the system comprising at least one component configured to control or adapt the status of at least one of the plurality of devices.

29. The system according to claim 28, wherein the communications unit is selected from the group consisting of:
a mobile unit;
a fixed structure;
an emergency response vehicle; and
a water-based vehicle.

30. The system according to claim 29, wherein:
the mobile unit comprises a vehicle;
the fixed structure comprises a building; and
the water-based vehicle comprises a boat.

* * * * *